July 12, 1960

G. WIGGERMANN 2,944,529

ROTARY SLIDE VALVES FOR HYDRAULIC PISTON MACHINES

Filed Aug. 6, 1957

United States Patent Office 2,944,529
Patented July 12, 1960

2,944,529
ROTARY SLIDE VALVES FOR HYDRAULIC PISTON MACHINES

Georg Wiggermann, Kressbronn, Germany, assignor of one-half to Walter Reiners, M. Gladbach, Germany Filed Aug. 6, 1957, Ser. No. 676,585

Claims priority, application Germany Aug. 11, 1956

8 Claims. (Cl. 121—62)

My invention relates to rotary slide valves for multi-cylinder piston machines, particularly hydraulic motors and pumps with rotating cylinders.

Such valves have the purpose to sequentially connect the individual cylinders, in synchronism with the piston strokes, with the inlet and outlet ducts for the liquid-working medium, usually oil.

It is one of the objects of my invention to improve the pressure-sealing conditions at the slide-valve surfaces and to secure a uniform distribution of the sealing pressure over the entire area of the valve surfaces acted upon by the hydraulic pressure.

These and more specific objects of my invention, as well as the novel features set forth with particularity in the claims annexed hereto, will be explained hereinafter with reference to the drawings, in which—

The same reference numerals are used in all illustrations for similar components respectively.

Figure 1:
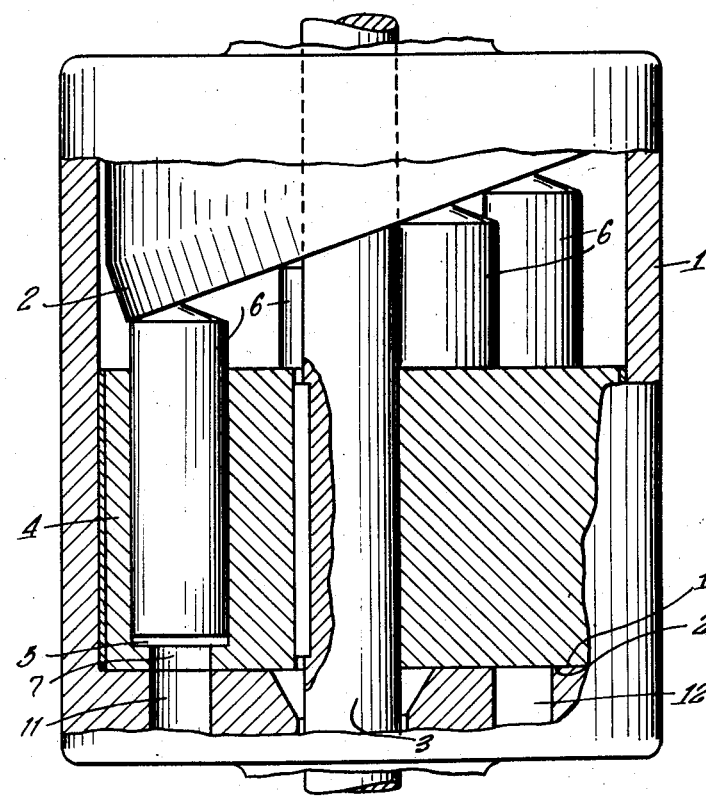
Fig. 1 is a schematic illustration, partly in axial section, of a hydraulic machine which incorporates a rotary valve device according to the invention and is illustrated merely as an example of the general type of hydraulic machinery to which the invention applies.

Generally, machines of the type here involved have pistons reciprocating in respective cylinders or bores which are distributed about the drive shaft and extend in parallel, inclined or radial relation thereto. The individual cylinders are sequentially connected, in timed relation to the reciprocating piston movements, with stationary valve ducts or slots for supplying and discharging the hydraulic working medium. For this purpose, the member or drum in which the cylinder bores are located is rotatable in face-to-face engagement with a fixed valve surface on a stationary component of the machine housing structure and is provided with ports which periodically establish a communication between the respective cylinder bores and the valve slots of the fixed valve surface. The rotating member thus forms together with the fixed valve surface a valve device of the rotary slide-valve type; and the invention proper concerns itself with such slide-valve devices.

In most cases, the two valve surfaces are pressed against each other by the pressure of the hydraulic working medium, such as oil, in order to provide for the necessary sealing of the ducts and ports. The sealing pressure is produced, for instance, by the reaction forces of the pistons, or by equivalent force components, which urge the valve surface of the rotatable cylinder member against the fixed valve surface. The two mutually engaging surfaces of the rotary slide-valve device may have cylindrical, conical, spherical or planar shape. As mentioned, each cylinder port opens into the valve surface of the cylinder member and travels periodically over the slots in the fixed valve surface during rotation of the cylinder member so that a temporary communication is established between the slots and the ports. This will be more fully understood with reference to the machine exemplified by Fig. 1.

The illustrated machine has a stationary housing 1 in which a slanting control body 2 is mounted. The housing is axially traversed by a shaft 3 on which a drum-shaped cylinder structure 4 is mounted. The cylinder drum 4 has a number of cylinder bores 5 uniformly distributed about the shaft 3 and extending parallel to the shaft axis. Pistons 6 are reciprocable in the respective cylinder bores. Each cylinder bore has a port 7 which, in the proper rotational position of the cylinder bore, communicates with one of two control slots 11 or 12 in a planar valve surface 13 of the housing assembly. The slots 11 and 12 are connected with oil inlet and outlet lines respectively.

Assuming that the machine is operating as a pump, the shaft 3 is driven to rotate the cylinder structure 4 while the oil lines are under pressure. During rotation of the cylinder structure 4, the pistons 6, in sliding engagement with the race surface of member 2, are periodically moved into and out of the cylinder bores so as to form respective variable-volume chambers together with the cylinder structure. The piston 6 shown in lowermost position at the left side of the illustration moves upwardly and inducts oil through the inlet slot 11 and the port 7 until it almost reaches the uppermost position of the piston 6 shown at the outermost right of the cylinder drum. Thereafter, the port 7 is connected with the outlet slot 12, and the piston is forced back into the cylinder bore to deliver oil into the slot 12, proper check valves being provided in the inlet and outlet lines as usual for such purposes.

For maintaining the sealing pressure required between the mutually engaging gliding surfaces of the rotary valve incorporated in the above-described machine, advantage is taken in most cases of the pressure of the liquid-working medium which produces beneath each piston a reaction force that presses the cylinder structure 4 against the stationary valve surface. This sealing pressure is in a constant ratio to the pressure of the working medium, and the total area of the control slots 11, 12 in the stationary valve surface has a counteracting effect relative to the sealing pressure and must be so dimensioned that nevertheless a sufficient seal between the mutually engaging valve surfaces, as well as good lubrication and smallest possible friction, is secured.

If this requirement, relative to the sealing areas around the valve slots, is satisfied by proper dimensioning of the valve areas, then the sealing conditions at the locations between the valve slots are necessarily much less favorable because these particular areas are not hydrostatically relieved and thus are subjected to increased area pressure with the result that these intermediate areas cause increased friction and develop relatively high resistance to starting the machine from standstill. Even without the presence of the increased area pressure at these localities, the friction of the rotating valve member may already be excessive because areas of larger size glide upon each other at the locations between the valve slots. It is, therefore, desirable to provide for best possible uniformity of the hydraulic relieving conditions over the entire area of the valve surfaces. However, when considering any expedients suitable to secure these desired sliding and sealing conditions, it must be kept in mind that there is another source of trouble relative to the desired condition of equilibrium or uniformity. This other source of trouble is the fact that during rotation of the cylinder structure there is a continuous variation in the position of the cylinders relative to the areas between the stationary valve slots. Consequently, it is not feasible to use any relieving means whose effect does not periodically vary during rotation of the cylinder structure. For example, the resulting reaction force of all pistons, subjected to the pressure of the liquid medium, periodically changes its position and magnitude within the period of one rotation; and any attempt at providing for hydraulic relief at the gliding surfaces of the rotary valve must take this phenomenon into account.

It is, therefore, a more specific object of my invention to provide pressure-equalizing means which very closely approach the desired sealing and running conditions of the valve surfaces gliding upon each other.

To this end, and in accordance with a feature of my invention, I provide between the control slots of a stationary valve surface a number of grooves or recesses which are located in the annular range traveled over by the slots and port openings of the valve and which are so shaped that during the controlling operation of the valve device no unthrottled hydraulic short-circuit connection is formed between these control openings.

According to a more specific feature of the invention, the total amount of the area covered by the recesses between the control openings of the valve is so adapted to the sealing areas radially surrounding and limiting the control openings, that approximately the same hydraulic relieving effect is produced over the entire valve area subjected to the hydraulic pressure.

The above-mentioned recesses, provided in accordance with the invention, are effective periodically and only as long as they are traveled over by the control opening or port of a cylinder. Besides, the active area of the recesses is adapted to the dimensions of the cylinder structure so that this area becomes effective at the correct moment and then produces the additional pressure relief aimed at with respect to the valve areas located between the valve-control openings, i.e. the slots or ports.

The necessity for providing sealing bridges between the individual recesses in order to prevent the occurrence of unthrottled hydraulic short-circuits imposes a limitation upon the permissible pressure-relieving area of the recesses. According to a further feature of my invention, however, this limitation is minimized by having the recesses extend a certain amount beyond the radial limits of the annular area to be traveled over by the control openings of the valve.

Figure 2:
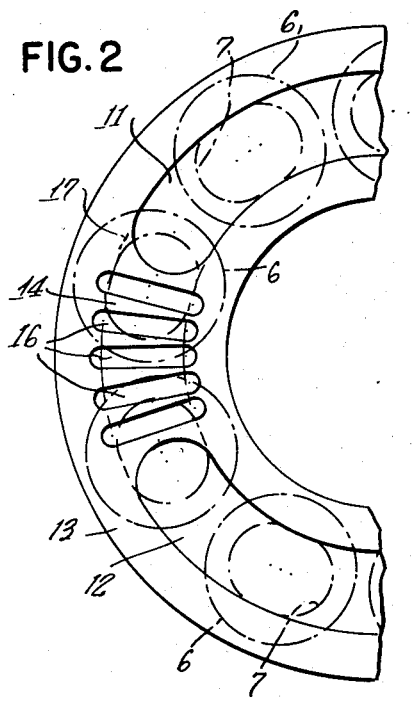
Fig. 2 is a partial view onto the active valve surface of the rotatable valve member.

The above-mentioned features and effects will be more fully understood by reference to Fig. 2 showing a view from above onto a portion of the stationary valve surface which comprises the inlet and outlet slots 11 and 12. The active control surface of the stationary valve member is denoted by 13. This surface is interrupted by the oil inlet and outlet slots 11 and 12. Located between the slots 11 and 12 is an arcuate area 14 which is provided with the above-mentioned number of recesses 16. In Fig. 2, the peripheries of the respective cylinders 6, located above the plane of illustration, are indicated by dot-and-dash circles. The cylinder ports 7 are shown in a similar way, and the annular area traveled over by the ports is identified by a broken line and denoted by 17.

The recesses 16 extend in radial directions approximately within the annular area 17 traveled over by the valve ports 7. The recesses reduce the size of the gliding surface and therefore also minimize friction. The oil cushions remaining in the recesses contribute to the same effect.

In some cases it is desirable, particularly for reducing operating noise, to keep the cylinder bores in communication with one or the other of the adjacent valve slots through a hydraulically resistant passage or throttle while the cylinders are traveling over the neutral zone 14 between the two slots. According to another feature of my invention, the above-mentioned recesses can be utilized for also satisfying this requirement. To this end, all or some of the adjacent recesses in the inter-slot area are connected by additional recesses, having throttling effect, with each other and also with one or both adjacent control slots.

For some cases of application it is preferable, according to a more specific feature of the invention, to design the above-mentioned throttling connection between the individual pressure-relieving recesses in such a manner that a limited, although greatly throttled, short-circuit flow between sequential control openings of the valve will occur. Such a short-circuiting flow is desirable, for instance, if the hydraulic blocking of the motor portion normally occurring during standstill of the pump in a hydraulic drive is to be eliminated up to a certain extent.

Figure 3:
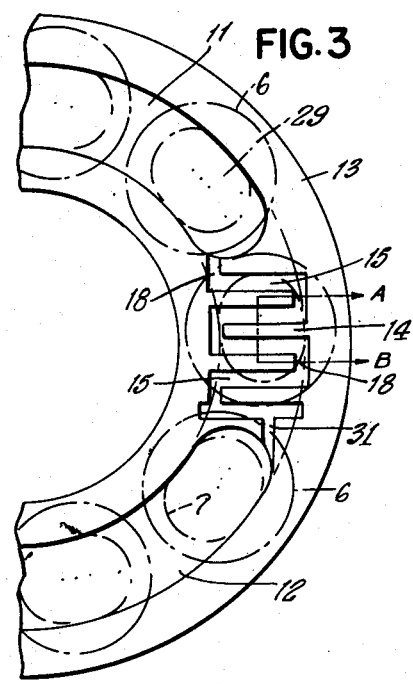
Fig. 3 is a similar partial view onto a modified form of such a valve surface.

The above-mentioned features concerning the throttling connection between the pressure-relieving recesses are embodied in the modification illustrated in Fig. 3 which also shows a view from above, relative to Fig. 1, onto the active valve surface of the stationary valve member.

In Fig. 3, the recesses in the valve surface between the control slots 11 and 12 are denoted by 15. These recesses extend in parallel relation to each other. They are in communication with each other and with the control slots 11, 12 through a number of additional recesses 18. The passage of oil made possible by the connecting grooves between the control slots 11 and 12 is very slight in relation to the total oil delivery, and has the effect that the increase and decrease of pressure in the cylinder spaces, when traveling over the neutral annular area 14 between the slots, does not occur so abruptly as to produce audible beats, so that the noise formation is reduced accordingly.

The cross connections 18 between the recesses 15 are preferably located at the inner and outer ends of these recesses in order to obtain a longest possible oil path and thus a uniform and sufficient throttling effect.

Figure 4:
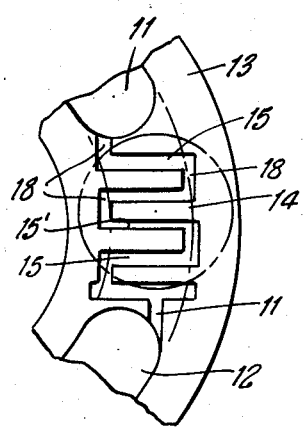
Fig. 4 is a partial view similar to Fig. 3 and showing a further modification relating to the stationary valve surface.

Instead of having the throttling effect mainly produced in the connecting passages 18, the approximately radial recesses 15 may also be used for this purpose as is illustrated in the modification shown in Fig. 4 where one of the recesses, denoted by 15′, is shown to have a smaller cross section in order to increase the throttling action.

Figure 5:
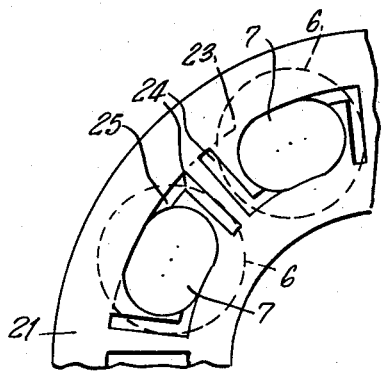
Figs. 5 and 6 are top views onto the valve surface of the stationary valve member and illustrate two different embodiments respectively.

In valve devices according to the invention as described above, the valve member that carries the cylinder port openings need not necessarily be provided with recesses between these openings. It is preferable, however, to also provide the control surface of the other valve member with recesses of the above-described type in the neutral zone between each two successive control openings or ports. Such a valve member is illustrated in Fig. 5 by a partial view from below onto the rotating valve surface of the machine shown in Fig. 1. The active valve surface is denoted in Fig. 5 by 21. The periphery of the cylinders 6, axially located behind the plane of illustration, is indicated by broken lines, and the annular area traveled over by the cylinder ports 5 is indicated by dot-and-dash lines 22. Recesses 24 are located in the neutral zone 23 between each two successive port openings 5 for the same reasons as explained above with reference to Figs. 3 and 4. The recesses 24 are connected by passages 25 with the adjacent port openings 5.

According to a preferred embodiment involving further features of the invention, only the slotted valve surface is provided with groups of recesses in the neutral zone as explained above, whereas the recesses in the other valve surface consist of auxiliary grooves which extend away from each two sequential control openings or ports in the direction of rotation and approach each other up to a tangential spacing equal or larger than the width of the recesses in the slotted valve surface.

In such a valve design, the substantially tangential grooves have the effect that at any moment, when the control ports of the cylinder are traveling over the neutral zone, the cylinder pressure is imposed upon as many recesses in the opposite valve control area as to make the sum of all pressure-relieving areas correspond to a large extent to the nth portion of the control surface traveled over by the control ports, where "n" denotes the total number of cylinders.

In such valve devices, the desired uniformly distributed hydraulic load conditions of the pressure-subjected gliding surfaces in the valve are attained in a particularly favorable degree over the entire area of the valve control surfaces.

Figure 6:
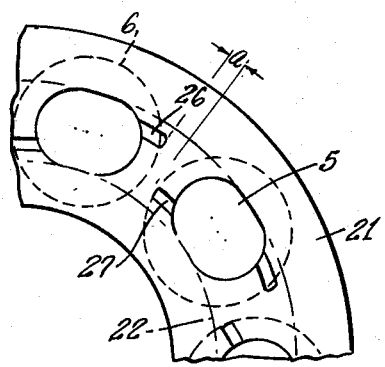

In accordance with the foregoing, the modified control surface 21 of the rotating valve member illustrated in Fig. 6 possesses, instead of the above-described recesses 15, 16 and 24, the auxiliary grooves denoted by 26 and 27. These grooves extend in tangential direction, i.e. in the direction of valve rotation, between adjacent control openings or ports 5 and approach each other up to a distance "a." For avoiding a hydraulic short-circuit through the recesses (15, 16) of the other valve member, the spacing "a" must be equal or larger than the width of the individual recesses in the other valve surface.

Figure 7:
Fig. 7 shows on larger scale a partial view of a cross section taken at the location indicated in Fig. 3 by A—B.

The cross-sectional shape of the recesses and grooves in the direction of valve rotation may be rectangular, semicircular, or may be given any other suitable shape. However, aside from the hydrostatic pressure relief attained by virtue of the above-described recesses, an additional hydrodynamic relief can be secured according to the invention by having the profile of the recesses form an acute angle with the valve surface in the direction of rotation. Such a preferred cross-sectional shape of the recesses is illustrated in Fig. 7. The recesses 15 are designed as shallow troughs whose curved surface forms an acute angle $\alpha$ with the control surface 13 in the direction of rotation. As a result, an oil cushion can form itself at the transition points which improves the lubricating conditions.

The particular design and arrangement of the recesses are not limited to the embodiments illustrated on the drawing. The purpose of the invention is also attainable if individual recesses extend in the peripheral direction and others in radial or transverse direction relative to the rotary valve motion, or have arcuate shape. It is also inessential for the operation of the valve device according to the invention which of the two control surfaces is kept stationary and which is rotatable. It should further be obvious that while the invention is described above with reference to a hydraulic machine which incorporates the valve device as part of a cylinder and housing structure, the invention is equally well applicable to rotary slide valves that form units separate from the machine to be controlled.

I claim:

1. A rotary slide-valve device for the control of hydraulic machines, comprising two valve members adapted for continuous rotation of one relative to the other and having respective control surfaces in face-to-face sliding engagement with each other, each of said valve members having mutually spaced control openings in each of said surfaces sequentially communicating during rotation with the control openings of the other member so as to sequentially provide continuous and cyclic mutual changing of portions of said respective surfaces in mutual contact as well as to continuously change the instantaneous magnitude of hydraulic pressure exerted upon a particular portion of said surface, at least one of said members having recesses in its control surface, said recesses being located intermediate and in communication with at least one of two adjacent control openings of said member in the traveling range of the control openings of the other member and spaced from said two adjacent control openings, whereby said recesses reduce pressure between said valve members while avoiding an unthrottled hydraulic short-circuit between said openings.

2. A rotary slide-valve device for the control of hydraulic machines, comprising two valve members adapted for continuous rotation of one relative to the other and having respective control surfaces in face-to-face sliding engagement with each other, each of said valve members having mutually spaced control openings in each of said surfaces sequentially communicating during rotation with the control openings of the other member so as to sequentially provide continuous and cyclic mutual changing of portions of said respective surfaces in mutual contact as well as to continuously change the instantaneous magnitude of hydraulic pressure exerted upon a particular portion of said surface, at least one of said members having recesses in its control surface, said recesses being located intermediate each two successive control openings of said member in the traveling range of the control openings of the other member and spaced from said two successive control openings, and throttling grooves interconnecting said recesses in said control surface of said one member.

3. A rotary slide-valve device for the control of hydraulic machines, comprising two valve members rotatable one relative to the other and having respective control surfaces in face-to-face sliding engagement with each other, each of said valve members having mutually spaced control openings in said surface sequentially communicating with the control openings of the other member, at least one of said members having recesses in its control surface, said recesses being located intermediate each two successive control openings of said member in the traveling range of the control openings of the other member and spaced from said two successive control openings, and throttling grooves connecting said recesses with said control openings in said control surface of said one member.

4. A rotary slide-valve device for the control of hydraulic machines, comprising two valve members rotatable one relative to the other and having respective control surfaces in face-to-face sliding engagement with each other, each of said valve members having mutually spaced control openings in said surface sequentially communicating with the control openings of the other member, at least one of said members having recesses in its control surface, said recesses being located intermediate each two successive control openings of said member in the traveling range of the control openings of the other member and spaced from said two successive control openings, said recesses being connected with each other and with said control openings in said control surface of said one member and forming together a continuous and substantially meander-shaped throttling passage between said two successive control openings.

5. A rotary slide-valve device for the control of hydraulic machines, comprising two valve members rotatable one relative to the other and having respective control surfaces in face-to-face sliding engagement with each other, each of said valve members having mutually spaced control openings in said surface sequentially communicating with the control openings of the other member, and each of said two members having recesses in its control surface, said recesses of each member extending transverse to the direction of rotation and being located intermediate each two successive control openings of said member in the traveling range of the control openings of the other member and in spaced relation to said two successive control openings.

6. A rotary slide-valve device for the control of hydraulic machines, comprising two valve members rotatable one relative to the other and having respective control surfaces in face-to-face sliding engagement with each other, each of said valve members having mutually spaced control openings in said surface sequentially communicating with the control openings of the other member, one of said members having recesses in its control surface, said recesses being located intermediate each two successive control openings of said member in the traveling range of the control openings of the other member and spaced from said two successive control openings, and said other member having grooves in its control surface, said grooves communicating with said respective control openings of said other member, and each of said grooves extending away from one of said latter openings substantially in the direction of rotation toward another one of said grooves up to a distance which in said direction is at least equal to the width of said recesses.

7. A rotary slide-valve device for the control of hydraulic machines, comprising two valve members rotatable one relative to the other and having respective control surfaces in face-to-face sliding engagement with each other, one of said valve members having inlet and outlet slots in its control surface, said slots extending on respective arcs about the axis of rotation and being peripherally spaced from each other to form intermediate neutral areas, said other valve member having a number of peripherally distributed ports in its control surface to sequentially travel over said respective slots, said one valve member having recesses extending approximately radially in each of said neutral areas in the traveling range of said slots, and said other valve member having grooves in its control surface, each of said grooves communicating with one of said respective ports and extending away therefrom to the groove coming from the next one of said ports, said two grooves terminating at a distance from each other, and said distance being at least equal to the width of said individual recesses in the direction of valve rotation.

8. In a rotary slide-valve device according to claim 1, said recesses having a cross-sectional shape tapering in the direction of valve rotation and forming an acute angle with said control surface.

References Cited in the file of this patent

UNITED STATES PATENTS

| | | |
|---|---|---|
| 463,138 | Carroll | Nov. 17, 1891 |
| 1,538,346 | Mueller | May 19, 1925 |
| 1,866,398 | Craig | July 5, 1932 |
| 2,465,954 | Wright | Mar. 29, 1949 |